(12) United States Patent
Teklinski

(10) Patent No.: US 11,219,200 B2
(45) Date of Patent: Jan. 11, 2022

(54) DREDGE RIGGING DEVICE

(71) Applicant: Sea Spider Jupiter LLC, Jupiter, FL (US)

(72) Inventor: Steven F. Teklinski, Jupiter, FL (US)

(73) Assignee: Sea Spider Jupiter, LLC, Jupiter, FL (US)

( * ) Notice: Subject to any disclaimer, the term of this patent is extended or adjusted under 35 U.S.C. 154(b) by 385 days.

(21) Appl. No.: 16/234,806

(22) Filed: Dec. 28, 2018

(65) Prior Publication Data

US 2019/0200593 A1    Jul. 4, 2019

Related U.S. Application Data

(60) Provisional application No. 62/611,638, filed on Dec. 29, 2017.

(51) Int. Cl.
*A01K 91/053* (2006.01)
*A01K 91/08* (2006.01)

(52) U.S. Cl.
CPC ............ *A01K 91/053* (2013.01); *A01K 91/08* (2013.01)

(58) Field of Classification Search
CPC .............................. A01K 91/053; A01K 91/08
USPC ........................................................ 43/42.74
See application file for complete search history.

(56) References Cited

U.S. PATENT DOCUMENTS

| | | | | |
|---|---|---|---|---|
| 1,352,979 A * | 9/1920 | Lawrence | ............ | A01K 91/053 43/42.74 |
| 1,782,010 A * | 11/1930 | Meyer | .................. | A01K 91/053 43/42.74 |
| 2,223,922 A * | 12/1940 | Schofield | ............. | A01K 91/053 43/42.74 |
| 2,397,030 A * | 3/1946 | Mercier | ................. | A01K 91/04 43/42.74 |
| 2,683,324 A * | 7/1954 | Engelman | ............ | A01K 91/053 43/42.74 |
| 2,780,023 A * | 2/1957 | Mercier | ................. | A01K 95/00 43/42.74 |

(Continued)

FOREIGN PATENT DOCUMENTS

| | | | | |
|---|---|---|---|---|
| EP | 0085797 A1 * | 8/1983 | ........... | A01K 91/053 |
| GB | 191123577 A * | 8/1912 | ........... | A01K 91/053 |

(Continued)

OTHER PUBLICATIONS

Translation of JP 2008-220182 (Year: 2008).*

*Primary Examiner* — Darren W Ark
(74) *Attorney, Agent, or Firm* — McHale & Slavin, P.A.

(57) ABSTRACT

An improved dredge rigging device for use in fishing to mimic a school of fish. The dredge rigging device is preferably formed from three rod members having a V-shaped central portion with two arms extending therefrom. The rod members are 17-4PH martensitic stainless steel and precipitation hardened to a max hardness of about 46RD and an annealed hardness of about 32RC. The central portions of each rod member are secured within a compressed lead junction member. The V-shaped central portions allowing the rod members to be equally spaced apart allowing an improved dredging device that is inexpensive to manufacture yet highly resistant to fatigue and corrosion. Each arm is available for securing artificial lures thereto with a conventional crimp.

7 Claims, 3 Drawing Sheets

(56) References Cited

U.S. PATENT DOCUMENTS

| | | | | |
|---|---|---|---|---|
| 3,067,538 A * | 12/1962 | Hines | ............... | A01K 95/00 43/42.74 |
| 3,105,318 A * | 10/1963 | Birrell | ............... | A01K 93/00 43/43.15 |
| 3,646,700 A * | 3/1972 | Pond | ............... | A01K 91/053 43/42.74 |
| 3,991,505 A * | 11/1976 | Simeti | ............... | A01K 91/053 43/42.74 |
| 4,893,432 A * | 1/1990 | Rosengrant | ............... | A01K 91/053 43/42.74 |
| 6,000,166 A * | 12/1999 | Kirkpatrick | ............... | A01K 91/06 43/42.74 |
| 7,412,795 B2 * | 8/2008 | Glynn | ............... | A01K 91/04 43/42.74 |
| 8,572,887 B2 * | 11/2013 | Adelman | ............... | A01K 91/053 43/42.74 |
| 9,578,862 B2 * | 2/2017 | Taboada | ............... | A01K 99/00 |
| 9,591,840 B2 * | 3/2017 | LeHew | ............... | A01K 85/10 |
| 10,130,086 B2 * | 11/2018 | Adelman | ............... | A01K 91/053 |
| 2003/0208948 A1 * | 11/2003 | Higgins | ............... | A01K 91/053 43/42.74 |
| 2005/0050790 A1 * | 3/2005 | Higgins | ............... | A01K 91/053 43/42.74 |
| 2011/0192071 A1 | 8/2011 | Adelman | | |
| 2017/0164595 A1 * | 6/2017 | Taboada | ............... | A01K 91/08 |
| 2020/0305402 A1 * | 10/2020 | Xyong | ............... | A01K 91/053 |

FOREIGN PATENT DOCUMENTS

| | | | | |
|---|---|---|---|---|
| GB | 2088681 A | * | 6/1982 | ......... A01K 91/053 |
| GB | 2088681 | | 10/1984 | |
| JP | H0650468 U | * | 7/1994 | |
| JP | 07023680 A | * | 1/1995 | |
| JP | 2562113 B2 | * | 12/1996 | |
| JP | 2620750 B2 | * | 6/1997 | |
| JP | 3049791 U | * | 6/1998 | |
| JP | 10178987 | | 7/1998 | |
| JP | 2008118970 A | * | 5/2008 | |
| JP | 2008220182 A | * | 9/2008 | |
| JP | 3154842 U | * | 10/2009 | |
| JP | 3178303 U | * | 9/2012 | |
| JP | 2013169184 A | * | 9/2013 | |
| KR | 100751564 B1 | * | 8/2007 | |

* cited by examiner

DREDGE RIGGING DEVICE

PRIORITY CLAIM

In accordance with 37 C.F.R. 1.76, a claim of priority is included in an Application Data Sheet filed concurrently herewith. Accordingly, the present invention claims priority to U.S. Provisional Patent Application No. 62/611,638 entitled "DREDGE RIGGING DEVICE" filed on Dec. 29, 2017 the contents of which is incorporated herein by reference in its entirety.

FIELD OF THE INVENTION

The present invention relates generally to the field of fishing and, more specifically, to an improved rigging device for trolling.

BACKGROUND

Dredges, dredge bars, umbrella rigs, and teaser rigs are all common names for a rigging device that is trolled behind a boat for use in attracting fish. The rigging device positions an array of artificial bait designed to mimic a school of fish. It is commonly known that certain game fish are naturally enticed by the passing of a school of fish array. A fisherman will then position a baited hook near the fish array, which greatly increases the possibility of catching a fish. The rigging is typically pulled behind a vessel, wherein movement of the fish array is enhanced by the wave action in combination and boat propeller wash.

Conventional dredge rigging consists of a central member having multiple teaser arms extending outwardly therefrom. The arms are typically constructed of metal wire. The trolling of a boat with the rigging placed behind the boat can further create air bubble streams that can entice a fish into changing the fish array coupled to the dredge rigging. Each arm of the dredge rigging device can be further equipped with various lures or lures. For instance, color strips, mirror pieces, artificial ballyhoo or squid are but a few lures that can enhance the arms of the rigging member. However, the rigging arms can be subject to various forces when drawn through ocean water that can quickly render the rigging inoperable. Ocean dragging is particularly harsh on umbrella type rigs both due to the salt content and the extreme stress the rigging is subjected too while trolling in rough seas. It is not uncommon for fisherman to troll in 6 to 8 foot seas, wherein the wave movement can readily bend or break rigging arms. Once a rigging arm is bent or broken, the rigging no longer tracks properly which lessens the effectiveness of the device. Attempts can be made to repair the rigging, but typically the rigging will not operate in the as new original condition, necessitating the purchase of a new rigging device.

Examples of dredge rigging includes U.S. Pat. No. 1,782,010, which discloses a method of assembling the parts of fish hook spreaders of the type having a wire provided with hook attaching eyes at its extremities and a line attaching swivel member loosely engaged. U.S. Pat. No. 1,352,979 discloses a fish line spreader used by fishermen for supporting a plurality of fish hooks from a single line. U.S. Pat. No. 2,223,922 discloses a spreader designed primarily for use in fishing; one of the objects within a body of water will rotate freely. U.S. Pat. No. 2,683,324 discloses a fish-hook spreader providing a self-stabilizing and self-standing spreader. U.S. Pat. No. 6,000,166 discloses a ganged trolling device. U.S. Pat. No. 9,591,840 discloses an umbrella fishing rig having a head piece, a cap, and at least one dual teaser arm piece.

What is needed in the industry is a dredge rigging device that is inexpensive to manufacture but constructed of materials capable of handling high water pressure to reduce or eliminate rigging arm failures.

SUMMARY

A dredge rigging device formed from three stainless steel or titanium rod members having a V-shaped central portion with two arms extending therefrom. The central portions of each rig member are secured within a compressed lead junction member. The V-shaped central portion allows the rod members to be equally spaced apart. The materials of construction provide an improved dredging device by addressing fatigue and corrosion issues of conventional devices. The simplicity of design provides superior tracking when towed through the water. Each of the arms is available for securing artificial lures thereto with crimps. When the dredge fishing rig is trolled behind the trolling vessel, the rig with attached artificial lures mimics a school of fish.

An objective of the invention is to disclose a dredge type rigging device formed from a material that permits lures to mimic fish presentation, allows faster trolling speeds than conventional dredge rigging devices, and is not susceptible to rigging deformation.

Another objective of the invention is to disclose a dredge type rigging device having heat treated steel rod members that are martensitic stainless steel to eliminate fatigue failure which commonly occurs with conventional rigging pulled behind a vessel in seas.

Still another objective of the invention is to disclose a dredge type rigging device using 17-4PH stainless steel rod members that can be hardened to a max hardness of about 46RD and an annealed hardness of about 32RC.

Yet still another objective of the invention is to disclose a dredge type rigging device using tempered rod steel that allows large diameter rigging legs, wherein bait can be crimped to directly to rigging legs.

Another objective of the invention is to disclose a dredge type rigging device that is inexpensive to manufacture.

Other objectives and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

DETAILED DESCRIPTION OF THE PREFERRED EMBODIMENT

Detailed embodiments of the instant invention are disclosed herein, however, it is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure.

Figure 1:
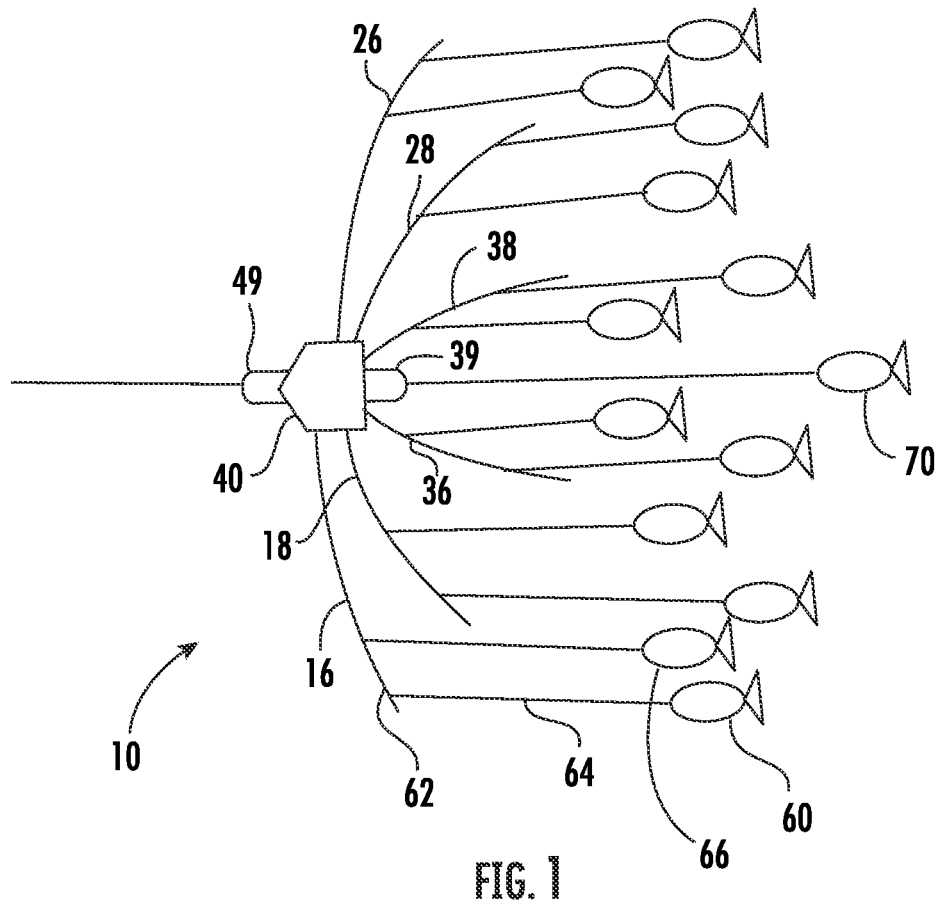
FIG. 1 is a pictorial side view of the dredge rig with artificial lures attached.

Referring to the Figures, set forth is the dredge fishing rig 10 of the instant invention comprising a first rod member 12 formed from a single piece of stainless steel rod having a V-shaped central portion 14 and two arms 16, 18 extending from the central portion 14. A second rod member 22 formed from a single piece of stainless steel rod having a V-shaped central portion 24 and two arms 26, 28 extends from the central portion 24. And, a third rod member 32 formed from a single piece of stainless steel rod having a V-shaped central portion 34 and two arms 36, 38 extends from the central portion 34. Each rod member is formed from 17-4PH stainless steel (SAE Type 630) which is hardened to a max hardness of about 46RD and an annealed hardness of about 32RC. A heat treatment process which yields about 42RC-46RC is called H900 condition. 17-4PH having preferred fatigue resistance and corrosion resistance properties, and remains magnetic so it is easy to check integrity. Martensitic grades are basically Fe—Cr alloys with a higher carbon content than ferritic stainless steels, which enables them to harden on cooling in air or water. The V-shaped central portion 14, 24, and 34 formed in each rod member are tempered to maintain the formed central portion. 17-4PH stainless steel has been found to provide unique properties to this application, is inexpensive to manufacture and resists fatigue or the like unequal bending of arms which is known to cause improper rig tracking when used behind a trolling vessel. Further, the 17-4PH allows the use of a larger size rods, yet maintains superior flexibility necessary at higher trolling speeds allowing the arms of the members to bend backwards as depicted in FIG. 1 while being pulled through water. Alternatively, titanium rods can be employed utilizing the same V-shaped configurations at an additional expense.

The rod members are secured in a spaced apart position by a junction member 40. The junction member 40 is constructed of lead, having a lower portion 42 with a first set of V-shaped grooves 44 constructed and arranged to receive a lower side of the first V-shaped central portion 14, a second set of V-shaped grooves 46 constructed and arranged to receive a lower side of the second V-shaped central portion 24, and a third set of V-shaped grooves 48 constructed and arranged to receive a lower side of the third V-shaped central portion 34. A rigging hook 39 is positioned in the lower portion 42. Similarly, an upper portion 50 of the junction member 40 has a first set of V-shaped grooves 54 constructed and arranged to receive an upper side of the first V-shaped central portion 14, a second set of V-shaped grooves 56 constructed and arranged to receive an upper side of the second V-shaped central portion 24, and a third set of V-shaped grooves 58 constructed and arranged to receive an upper side of the third V-shaped central portion 54. A towing hook 49 is positioned in the upper portion 50. The upper portion 50 is preferably a conical shaped surface 55, allowing the junction member 40 to flow through water with less resistance providing centralized tracking.

The upper portion 50 and the lower portion 42 are assembled with pressure and heat to permanently secure the rod members therebetween. It is noted that the V-shaped grooves, in combination with the V-shaped central portions, prohibit removal from the junction member 40. Further, the V-shaped grooves maintain the V-shaped central portions in a common plane, wherein bending of the rods occurs outside the junction member 40. Unique to this invention is the choice of materials that allows the bending to occur without fatigue. Dragging any rig, lure, bait or the like device behind a vessel subjects the device to an enormous amount of water pressure. Use of the stated material allows thin or thick rod sizes. A larger rod size can be used which makes crimping easier. The preferred rod size is about 3 mm, the preferred length L1 from the junction member 40 to an end of each arm is about 600 mm.

Figure 2:
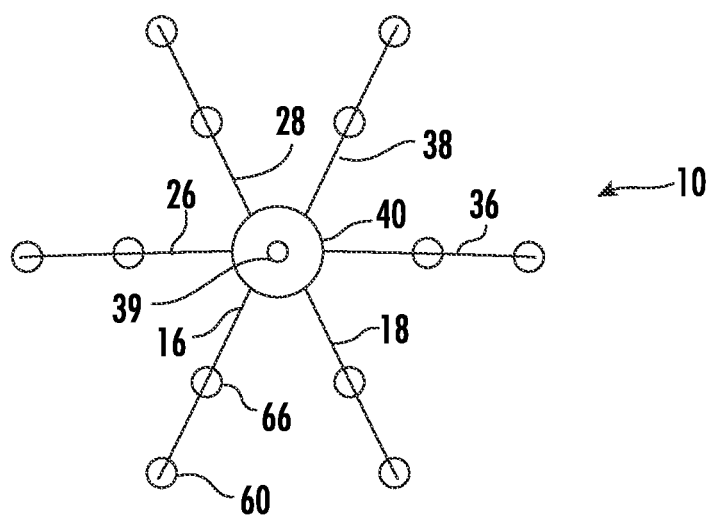
FIG. 2 is a front view of FIG. 1.
Figure 3:
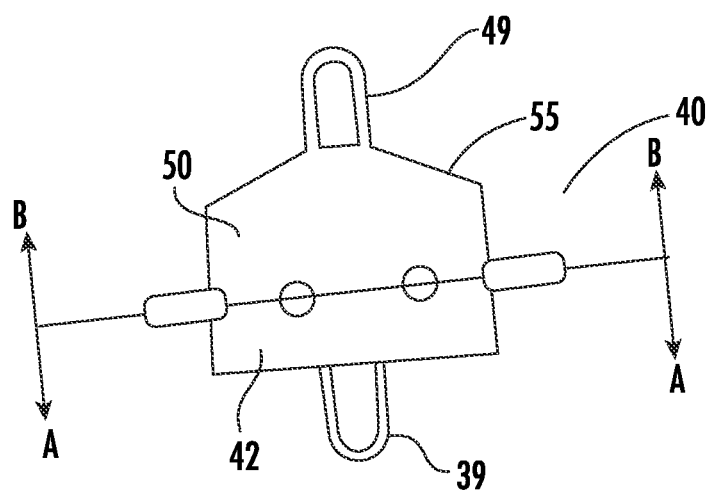
FIG. 3 is an enlarged side view of the junction member.
Figure 4:
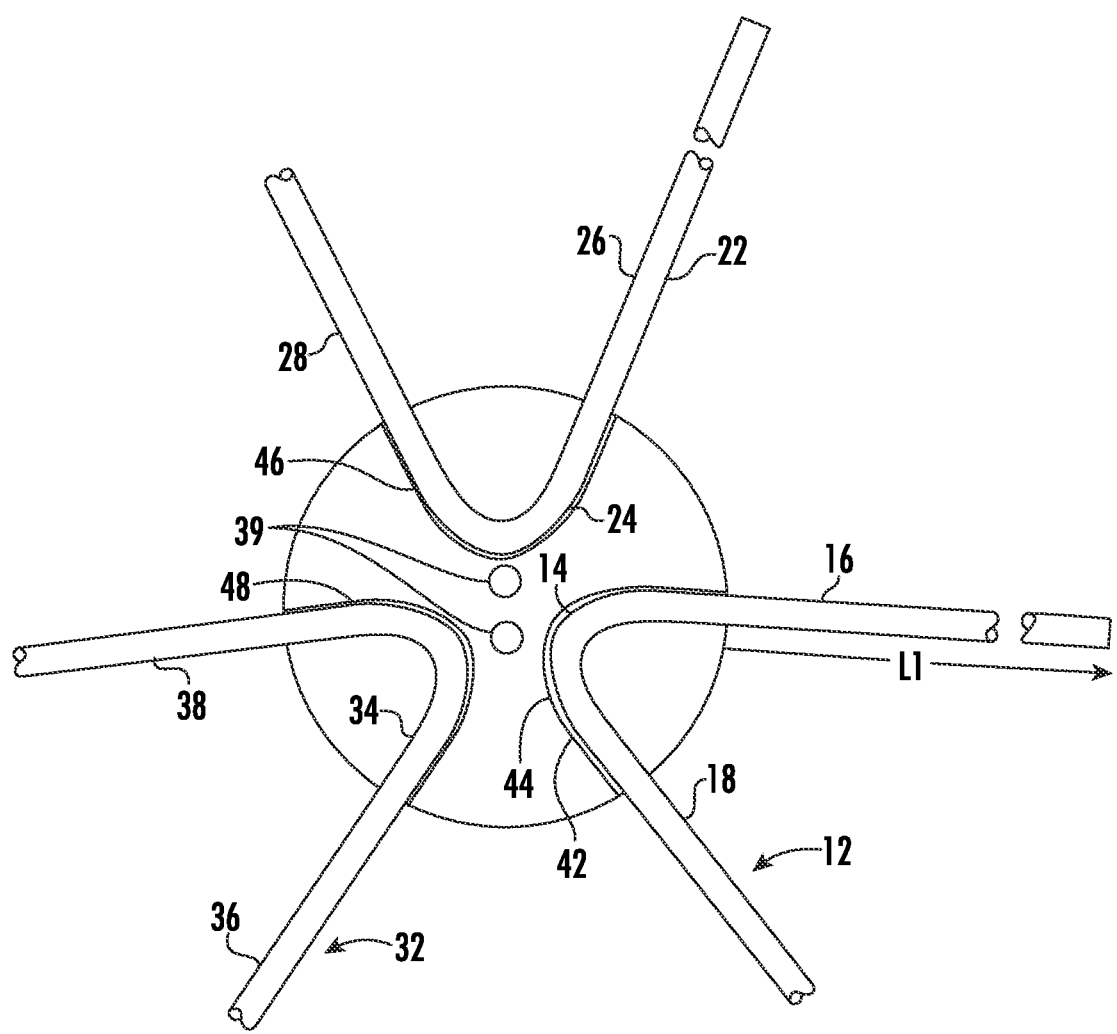
FIG. 4 is a cross sectional view taken along lines A-A of FIG. 3.
Figure 5:
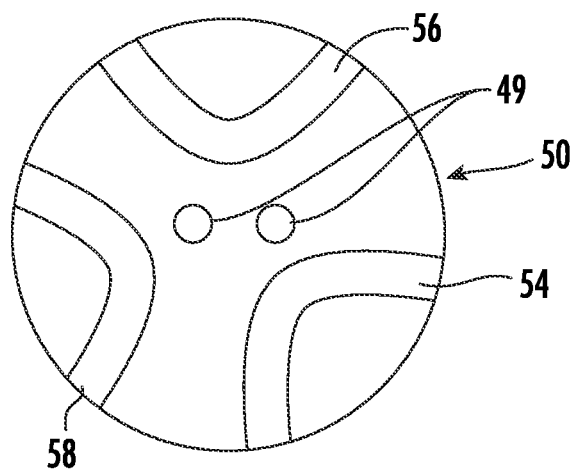
FIG. 5 is a partial cross sectional view taken along lines B-B of FIG. 3.
Figure 6:
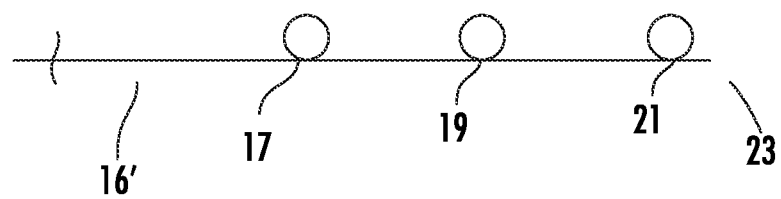
FIG. 6 is a plane view of an arm with attachment loops.

Artificial bait 60 is coupled along an end of each arm 16 using a crimp 62 or the like with a flexible leader line 64 between the crimp 62 and the artificial lure. Each arm can have multiple artificial baits attached thereto, as illustrated by bait 66 attached along a length of the arm 16. For simplicity of the drawings, the remainder of the baits depicted in FIGS. 1 and 2 are not enumerated as their description would be redundant and would make viewing of the Figures more difficult. FIG. 6 depicts an arm 16' with three preformed loops 17, 19, which can be used in place of a straight arm 16 which requires the crimp 62 for attachment of the artificial bait. In this embodiment, the formed loops allow artificial bait to be tied to a loop to facilitate attachment of the artificial bait. In addition, each formed loop operates a spring bias where a preformed leader securing artificial bait on one end and a hoop on the other end can slide over the end 23 and along the length of the arm 16' to engage an opening formed by a loop for ease of assembly.

Rigger hook 39 is available for receipt of artificial bait 70 crimped thereto with the towing hook 49 securable to a trolling vessel, not shown. The dredge fishing rig is trolled behind the trolling vessel, wherein the arms flex and in response to the water pressure wherein the lures mimic a school of fish. A fisherman would typically place a fishing line with a baited hook behind the dredge rig. It is commonly known that game fish are attracted to a school of fish, and will go after a fish that has separated from the school, i.e. the baited hook.

The term "artificial bait" in this disclosure can be any artificial item including feathers, strips, mirrors, plastic ballyhoo, or plastic squid, all of which can be of most any color, size and shape. The term "coupled" is defined as connected, although not necessarily directly, and not necessarily mechanically. The use of the word "a" or "an" when used in conjunction with the term "comprising" in the claims and/or the specification may mean "one," but it is also consistent with the meaning of "one or more" or "at least one." The term "about" means, in general, the stated value plus or minus 5%. The use of the term "or" in the claims is used to mean "and/or" unless explicitly indicated to refer to alternatives only or the alternative are mutually exclusive, although the disclosure supports a definition that refers to only alternatives and "and/or."

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements. Likewise, a step of a method or an element of a device that "comprises," "has," "includes" or "contains" one or more features, possesses those one or more features, but is not limited to possessing only those one or more features. Furthermore, a device or structure that is configured in a certain way is configured in at least that way, but may also be configured in ways that are not listed.

All patents and publications mentioned in this specification are indicative of the levels of those skilled in the art to which the invention pertains. It is to be understood that while a certain form of the invention is illustrated, it is not to be limited to the specific form or arrangement herein described and shown. It will be apparent to those skilled in the art that various changes may be made without departing from the scope of the invention, and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A dredge fishing rig, comprising:
   a first rod member formed from a single piece of stainless steel rod having a V-shaped central portion and two arms extending from opposing portions of the central portion;
   a second rod member formed from a single piece of stainless steel rod having a V-shaped central portion and two arms extending from opposing portions the central portion;
   a third rod member formed from a single piece of stainless steel rod having a V-shaped central portion and two arms extending from opposing portions of the central portion;
   a junction member securing said rod members, said junction member constructed and arranged to maintain each said rod member in a spaced apart position extending directly outward from said junction member, wherein said junction member is further defined by a lower section having V-shaped grooves constructed and arranged to receive a lower side of each said V-shaped central portion and an upper section having V-shaped grooves arranged to receive an upper side of each said V-shaped central portion, wherein each of said V-shaped grooves have a central portion and opposing portions which extend from the central portion in a diverging manner to an outer lateral surface of said junction member, wherein said two arms of each said rod member extend outwardly away from said junction member in a diverging manner, whereby said lower and upper sections are compressed together securing said first, second and third members in a fixed spaced apart position such that the V-shaped central portions are maintained in a common plane;
   a towing hook extending from an upper side of said junction member; and
   a rigging hook extending from a lower side of said junction member;
   wherein each said rod member is available for receipt of artificial bait crimped to each said arm, said towing hook securable to a trolling vessel whereby said dredge fishing rig is dragged behind a trolling vessel whereby said artificial bait mimic movements of a school of fish.

2. The dredge fishing rig according to claim 1, wherein said junction member is constructed of lead.

3. The dredge fishing rig according to claim 1, wherein an upper portion of said junction member is a conical shaped surface.

4. The dredge fishing rig according to claim 1, wherein each said arm has a length of about 600 mm.

5. The dredge fishing rig according to claim 4, wherein each said arm includes at least one preformed loop.

6. The dredge fishing rig according to claim 1, wherein said stainless steel rod is hardened to a max hardness of about 46RD and an annealed hardness of about 32RC.

7. The dredge fishing rig according to claim 1, wherein each stainless steel rod is about 3 mm in diameter.

* * * * *